(12) United States Patent
Gorantla et al.

(10) Patent No.: US 11,762,841 B2
(45) Date of Patent: *Sep. 19, 2023

(54) SYSTEM AND METHOD FOR IMPLEMENTING A DATA QUALITY CHECK MODULE

(71) Applicant: JPMorgan Chase Bank, N.A., New York, NY (US)

(72) Inventors: Chandra N Gorantla, Sugar Land, TX (US); Karthigeyan Kuppan, Houston, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/096,720

(22) Filed: Jan. 13, 2023

(65) Prior Publication Data
US 2023/0169064 A1    Jun. 1, 2023

Related U.S. Application Data

(63) Continuation of application No. 17/213,692, filed on Mar. 26, 2021, now Pat. No. 11,604,785.

(51) Int. Cl.
*G06F 16/00* (2019.01)
*G06F 16/23* (2019.01)
(Continued)

(52) U.S. Cl.
CPC ...... *G06F 16/2365* (2019.01); *G06F 16/2358* (2019.01); *G06F 16/2379* (2019.01); *G06F 17/18* (2013.01); *G06N 5/025* (2013.01)

(58) Field of Classification Search
CPC ............ G06F 16/2365; G06F 16/2358; G06F 16/2379; G06F 17/18; G06N 5/025
See application file for complete search history.

(56) References Cited

U.S. PATENT DOCUMENTS 9,176,708 B2 * 11/2015 Gallant ..................... G06F 7/24
9,558,230 B2 *  1/2017 Hollifield ............ G06F 16/2365
(Continued)

OTHER PUBLICATIONS

Official Communication Received in PCT Application No. PCT/US2022/21746, dated Jul. 18, 2022.

*Primary Examiner* — Noosha Arjomandi
(74) *Attorney, Agent, or Firm* — GREENBLUM & BERNSTEIN, P.L.C.

(57) ABSTRACT

Various methods, apparatuses/systems, and media for implementing a data quality check module for determining whether data is acceptable or not are disclosed. A processor collects all facts data corresponding to an agreement based on corresponding received distribution event data in accordance with margin requirements associated with the agreement and calculates statistical analysis data based on historical data points of the facts data for the agreement. The processor also creates and configures dynamic rules that are required to be applied for determining whether the agreement is in good order; verifies the statistical analysis data against the rules to determine anomaly data; marks the agreement as a good order agreement flag when it is determined that the anomaly data is within a predetermined threshold value; and automatically executes, in response to marking the agreement as a good order agreement flag, a straight through processing of the agreement.

20 Claims, 9 Drawing Sheets

(51) Int. Cl.
   *G06F 17/18*    (2006.01)
   *G06N 5/025*    (2023.01)

(56) References Cited

U.S. PATENT DOCUMENTS

| | | | | |
|---|---|---|---|---|
| 10,097,600 | B2* | 10/2018 | Banerjee | G06F 7/02 |
| 11,061,915 | B2* | 7/2021 | Park | G06F 11/0754 |
| 11,296,971 | B1* | 4/2022 | Jain | H04L 41/12 |
| 11,316,941 | B1* | 4/2022 | Jain | H04L 41/0816 |
| 11,416,754 | B1* | 8/2022 | Durvasula | G06N 3/08 |
| 2005/0027628 | A1* | 2/2005 | Lammersdorf | G06Q 40/00 |
| | | | | 705/35 |
| 2006/0235831 | A1* | 10/2006 | Adinolfi | G06Q 40/00 |
| 2011/0313812 | A1* | 12/2011 | Duvvoori | G06Q 10/0633 |
| | | | | 705/7.27 |
| 2011/0320357 | A1* | 12/2011 | Gilson | G06Q 40/00 |
| | | | | 705/45 |
| 2014/0067773 | A1* | 3/2014 | Urmanov | G06F 11/0754 |
| | | | | 707/E17.005 |
| 2014/0310231 | A1* | 10/2014 | Sampathkumaran | G06F 16/254 |
| | | | | 707/602 |
| 2016/0028921 | A1* | 1/2016 | Thrasher | H04N 1/40012 |
| | | | | 358/519 |
| 2016/0267082 | A1* | 9/2016 | Wong | G06F 16/164 |
| 2019/0129959 | A1* | 5/2019 | Jagwani | G06F 16/1873 |
| 2020/0279623 | A1* | 9/2020 | Ozeran | G16H 10/60 |
| 2020/0374305 | A1* | 11/2020 | Kursun | G06N 5/047 |
| 2021/0209486 | A1* | 7/2021 | Fan | G06N 20/20 |
| 2022/0019572 | A1* | 1/2022 | Das | G06F 11/3452 |
| 2022/0027380 | A1* | 1/2022 | Martin | G06Q 40/08 |
| 2022/0060502 | A1* | 2/2022 | Sheedy | G06N 20/00 |
| 2022/0309051 | A1* | 9/2022 | Gorantla | G06F 16/2358 |

\* cited by examiner

SYSTEM AND METHOD FOR IMPLEMENTING A DATA QUALITY CHECK MODULE

CROSS-REFERENCE TO RELATED APPLICATIONS

This application is a Continuation of U.S. application Ser. No. 17/213,692, filed Mar. 26, 2021, which is incorporated herein by reference in its entirety.

TECHNICAL FIELD

This disclosure generally relates to data processing, and, more particularly to methods and apparatuses for implementing a data quality check module that provides a platform for implementing a rules based configurable solution for good order that covers stale data checks, agreement data quality checks, etc., and for automatically validating against the configured rules standard deviation to determine if the data is acceptable or not.

BACKGROUND

The developments described in this section are known to the inventors. However, unless otherwise indicated, it should not be assumed that any of the developments described in this section qualify as prior art merely by virtue of their inclusion in this section, of that those developments are known to a person of ordinary skill in the art.

Most trades, valuations, and feeds, etc., may have data quality issues including duplicates, under representation or over representation, missing data, incorrect data affecting collateral valuations leading to wrong valuation results for the agreement. Typically, users manually fix the data as a work around each time and often such data, after manual fixing, may be lost in the next feed.

SUMMARY

The present disclosure, through one or more of its various aspects, embodiments, and/or specific features or sub-components, provides, among other features, various systems, servers, devices, methods, media, programs, and platforms for implementing a data quality check module that provides a platform liar implementing a rules based configurable solution for good order that covers stale data checks, agreement data quality checks, etc., and for automatically validating against the configured rules standard deviation to determine if the data is acceptable or not, and for generating results than flag the data as true or false for STP (Straight through processing), but the disclosure is not limited thereto. For example, the present disclosure, through one or more of its various aspects, embodiments, and/or specific features or sub-components, provides, among other features, various systems, servers, devices, methods, media, programs, and platforms for implementing a data quality check module that provides a platform for implementing rules based good order checks where rules are editable at run time without requiring code changes each time, thereby enabling STP and reducing manual intervention and providing faster SLA (Service-Level Agreement), compared to conventional processes, between a service provider and a client, but the disclosure is not limited thereto.

According to an aspect of the present disclosure, a method for implementing a data quality check module for determining whether data is acceptable or not by utilizing one or more processors and one or more memories is disclosed. The method may include: receiving distribution event data as input corresponding to margin requirements for an agreement between a client and a service provider; accessing one or more data sources for collecting all facts data corresponding to the agreement based on corresponding received distribution event data in accordance with margin node context identification associated with the agreement; calculating statistical analysis data based on historical data points of the facts data for the agreement with all combination of exposure types and methods; creating and configuring dynamic rules that are required to be applied for determining whether the agreement is in good order; verifying the statistical analysis data against the rules to determine anomaly data; marking the agreement as a good order agreement flag when it is determined that the anomaly data is within a predetermined threshold value; and automatically executing, in response to marking the agreement as a good order agreement flag, a straight through processing of the agreement without manual intervention.

According to yet another aspect of the instant disclosure, wherein the facts data may include one or more of the following data: margin requirement data, trade requirement data, collateralized trades data, and statistical data corresponding to the agreement, but the disclosure is not limited thereto.

According to a further aspect of the instant disclosure, wherein the anomaly data may indicate what data points our outliers and what data points are within the predetermined range for acceptable data points, but the disclosure is not limited thereto.

According to an additional aspect of the instant disclosure, the method may further include: marking the agreement as not a good order agreement flag when it is determined that the anomaly data is not within the predetermined threshold value; and blocking execution of the straight through processing of the agreement.

According to yet another aspect of the instant disclosure, the method may further include: determining what data points associated with the agreement are not within the predetermined threshold value; receiving input data indicating that the data points associated with the agreement that are not within the predetermined threshold have been manually verified; and automatically executing, in response to receiving the input data, a straight through processing of the agreement.

According, to yet another aspect of the instant disclosure, the method may further include: determining what data points associated with the agreement are not within the predetermined threshold value; receiving input data indicating that the data points associated with the agreement that are not within the predetermined threshold have been manually corrected to be within the predetermined threshold value; and automatically executing, in response to receiving the input data, a straight through processing of the agreement.

According to a further aspect of the instant disclosure, wherein in calculating statistical analysis data, the method may further include: calculating moving average data based on historical data points of the facts data for the agreement from a predefined time point; and calculating standard deviation data in response to calculating the moving average data.

According to another aspect of the instant disclosure, a system for implementing a data quality check module for determining whether data is acceptable or not is disclosed. The system may include: one or more databases that store distribution event data corresponding to margin requirements for an agreement between a client and a service provider: a receiver that receives the distribution event data as input; and a processor coupled to the one or more databases and the receiver via a communication network, wherein the processor may be configured to: access one or more data sources for collecting all facts data corresponding to the agreement based on corresponding received distribution event data in accordance with margin node context identification associated with the agreement; calculate statistical analysis data based on historical data points of the facts data for the agreement with all combination of exposure types and methods; create and configuring dynamic rules that are required to be applied the determining whether the agreement is in good order; verify the statistical analysis data against the rules to determine anomaly data; mark the agreement as a good order agreement flag when it is determined that the anomaly data is within a predetermined threshold value; and automatically execute, in response to marking the agreement as a good order agreement flag, a straight through processing of the agreement.

According to yet another aspect of the instant disclosure, the processor may be further configured to: mark the agreement as not a good order agreement flag when it is determined that the anomaly data is not within the predetermined threshold value; and block execution of the straight through processing of the agreement.

According to a further aspect of the instant disclosure, the processor may be further configured to: determine what data points associated with the agreement are not within the predetermined threshold value; receive input data indicating that the data points associated with the agreement that are not within the predetermined threshold have been manually verified; and automatically execute, in response to receiving the input data, a straight through processing of the agreement.

According to yet another aspect of the instant disclosure, the processor may be further configured to: determine what data points associated with the agreement are not within the predetermined threshold value; receive input data indicating that the data points associated with the agreement that are not within the predetermined threshold have been manually corrected to be within the predetermined threshold value; and automatically execute, in response to receiving the input data, a straight through processing of the agreement.

According to a further aspect of the instant disclosure, wherein in calculating statistical analysis data, the processor may be further configured to: calculate moving average data based on historical data points of the facts data for the agreement from a predefined time point; and calculate standard deviation data in response to calculating the moving average data.

According to yet another aspect of the present disclosure, a non-transitory computer readable medium configured to store instructions for implementing a data quality check module for determining whether data is acceptable or not is disclosed. The instructions, when executed, cause a processor to perform the following: receiving distribution event data as input corresponding to margin requirements for an agreement between a client and a service provider; accessing one or more data sources for collecting all facts data corresponding to the agreement based on corresponding received distribution event data in accordance with margin node context identification associated with the agreement; calculating statistical analysis data based on historical data points of the facts data for the agreement with all combination of exposure types and methods; creating and configuring dynamic rules that are required to be applied for determining whether the agreement is in good order; verifying the statistical analysis data against the rules to determine anomaly data; marking the agreement as a good order agreement flag when it is determined that the anomaly data is within a predetermined threshold value; and automatically executing, in response to marking the agreement as a good order agreement flag, a straight through processing of the agreement.

According to an additional aspect of the instant disclosure, wherein, when executed, the instructions may further cause the processor to perform the following: marking the agreement as not a good order agreement flag when it is determined that the anomaly data is not within the predetermined threshold value; and blocking execution of the straight through processing of the agreement.

According to a further aspect of the instant disclosure, wherein, when executed, the instructions may further cause the processor to perform the following: determining what data points associated with the agreement are not within the predetermined threshold value; receiving input data indicating that the data points associated with the agreement that are not within the predetermined threshold have been manually verified; and automatically executing, in response to receiving the input data, a straight through processing of the agreement.

According to yet another aspect of the instant disclosure, wherein, when executed, the instructions may further cause the processor to perform the following: determining what data points associated with the agreement are not within the predetermined threshold value; receiving input data indicating that the data points associated with the agreement that are not within the predetermined threshold have been manually corrected; and automatically executing, in response to receiving the input data, a straight through processing of the agreement.

According to a further aspect of the instant disclosure, wherein in calculating statistical analysis data, the instructions, when executed, may further cause the processor to perform the following: calculating moving average data based on historical data points of the facts data for the agreement from a predefined time point; and calculating standard deviation data in response to calculating the moving average data.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
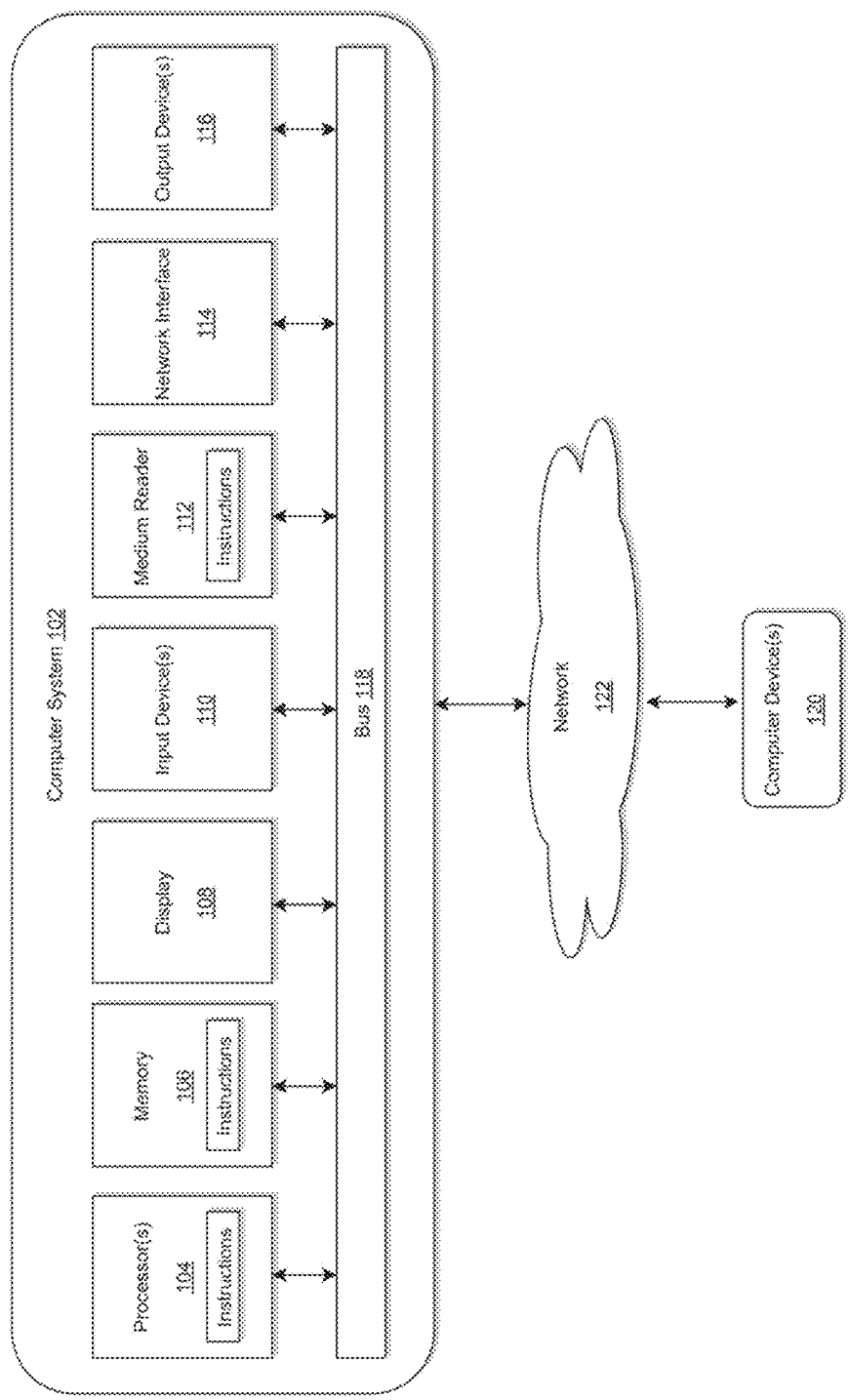
FIG. 1 illustrates a computer system for implementing a data quality check device in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of example embodiments may be physically combined into more complex blocks, units and/or modules without departing from the scope of the present disclosure.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
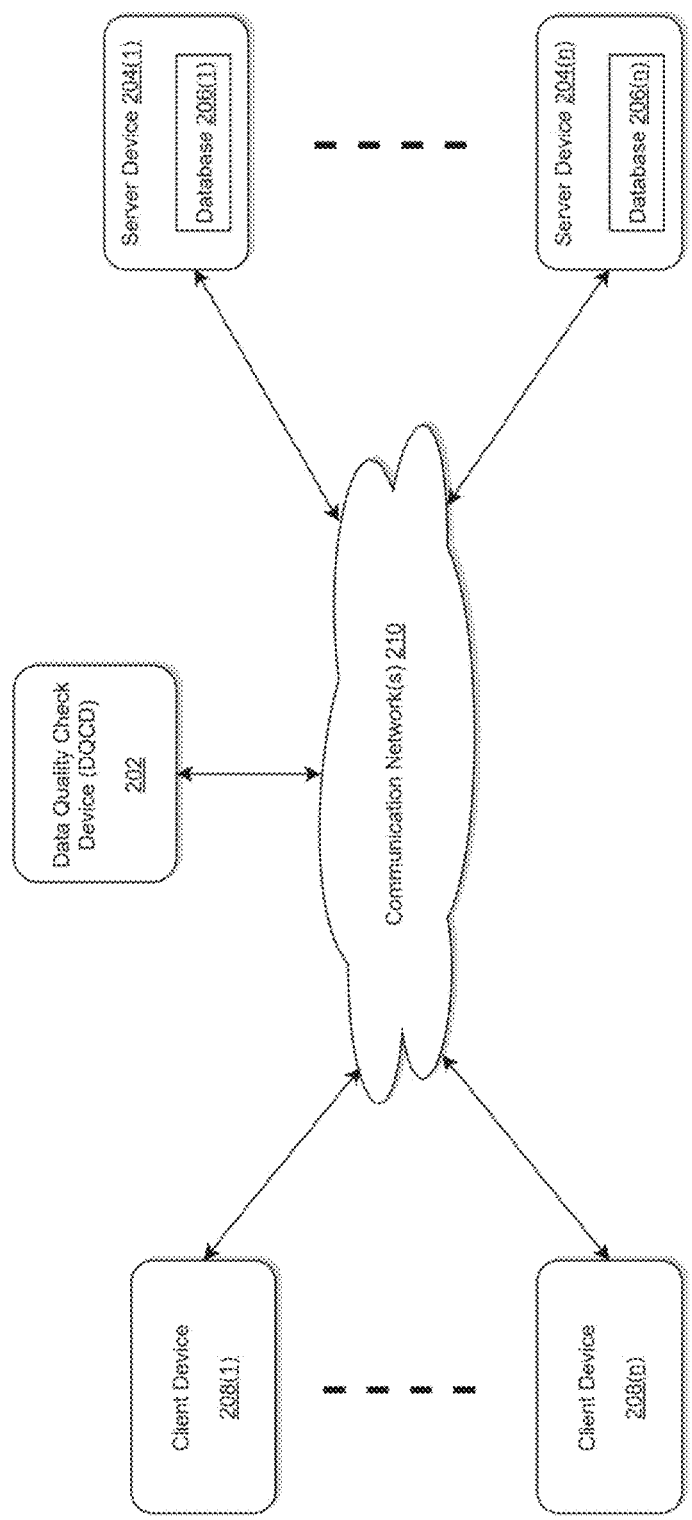
FIG. 2. illustrates an exemplary diagram of a network environment with a data quality check device in accordance with an exemplary embodiment.

Referring to FIG. 2, a schematic of an exemplary network environment 200 for implementing a data quality check device (DQCD) of the instant disclosure is illustrated.

According to exemplary embodiments, the above-described problems associated with conventional approach of data quality check and determining whether an agreement is in good order or not may be overcome by implementing an DQCD 202 as illustrated in FIG. 2 that may provide a dynamic platform for implementing a rules based configurable solution for good order that covers stale data checks, agreement data quality checks, etc., and for automatically validating against the configured rules standard deviation to determine if the data is acceptable or not, and for generating results that flag the data as true or false for STP (Straight through processing) without manual intervention, but the disclosure is not limited thereto. The various aspects, embodiments, features, and/or sub-components may also provide optimized processes of implementing the DQCD 202 which may be configured to provide a dynamic platform for implementing a data quality check module that provides a platform for implementing rules based good order checks where rules are editable at run time without requiring code changes each time, thereby enabling STP and reducing manual intervention and providing faster SLA (Service-Level Agreement), compared to conventional processes, between a service provider and a client, but the disclosure is not limited thereto.

The DQCD 202 may be the same or similar to the computer system 102 as described with respect to FIG. 1.

The DQCD 202 may store one or more applications that can include executable instructions that, when executed by the DQCD 202, cause the DQCD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DQCD 202 itself, may be located in virtual server(s) running in a cloud-based computing environment rather than being tied to one or more specific physical network computing devices. Also, the application(s) may be running in one or more virtual machines (VMs) executing on the DQCD 202. Additionally, in one or more embodiments of this technology, virtual machine(s) running on the DQCD 202 may be managed or supervised by a hypervisor.

In the network environment 200 of FIG. 2, the DQCD 202 is coupled to a plurality of server devices 204(1)-204(n) that hosts a plurality of databases 206(1)-206(n), and also to a plurality of client devices 208(1)-208(n) via communication network(s) 210. A communication interface of the DQCD 202, such as the network interface 114 of the computer system 102 of FIG. 1, operatively couples and communicates between the DQCD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DQCD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DQCD 202 may be a standalone device or integrated with one or more other devices or apparatuses, such as one or more of the server devices 204(1)-204(n), for example. In one particular example, the DQCD 202 may be hosted by one of the server devices 204(1)-204(n), and other arrangements are also possible. Moreover, one or more of the devices of the DQCD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DQCD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that an facilitate the implementation of the DQCD 202 that may efficiently provide a dynamic platform for implementing a rules based configurable solution for good order that covers stale data checks, agreement data quality checks, etc., and for automatically validating against the configured rules standard deviation to determine if the data is acceptable or not, and for generating results that flag the data as true or false for STP (Straight through processing), but the disclosure is not limited thereto. According to exemplary embodiments, the client devices 208(1)-208(n) in this example may also include any type of computing device that can facilitate the implementation of the DQCD 202 that may efficiently provide a dynamic platform for implementing a data quality check module that provides a platform for implementing rules based good order checks where rules are editable at run time without requiring code changes each time, thereby enabling STP and reducing manual intervention and providing faster SLA (Service-Level Agreement), compared to conventional processes, between a service provider and a client, but the disclosure is not limited thereto.

The client devices 208(1)-208(n) may run interface applications, such as standard web browsers or standalone client applications, which may provide an interface to communicate with the DQCD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the DQCD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DQCD 202, the server devices 204(1)-204(n), or the client devices 208(1)-208(n), for example, may be configured to operate as virtual instances on the same physical machine. For example, one or more of the DQCD 202, the server devices 204(1)-204(n), or the client devices 208(1)-208(n) may operate on the same physical device rather than as separate devices communicating through communication network(s) 210. Additionally, there may be more or fewer DQCDs 202, server devices 204(1)-204(n), or client devices 208(1)-208(n) than illustrated in FIG. 2. According to exemplary embodiments, the DQCD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network(s) using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
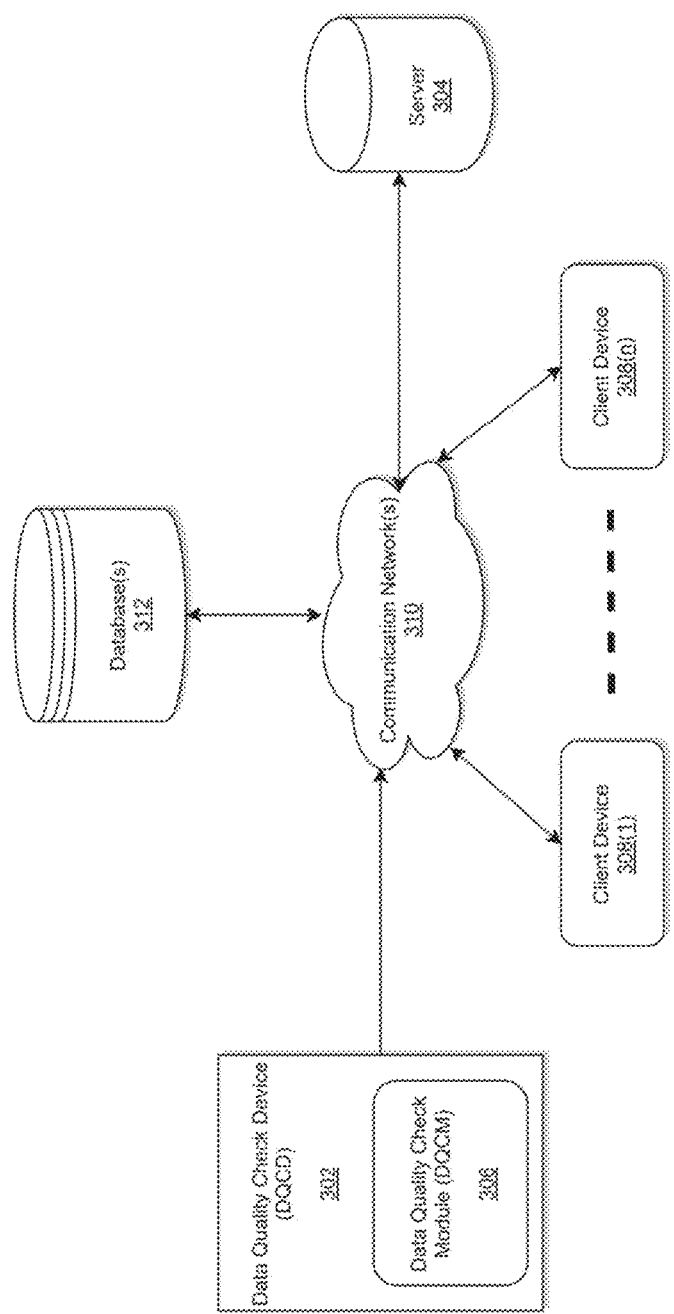
FIG. 3 illustrates a system diagram for implementing a data quality check device having a data quality check module in accordance with an exemplary embodiment.

FIG. 3 illustrates a system diagram for implementing a data quality check device (DQCD) having a data quality check module (DQCM) in accordance with an exemplary embodiment.

As illustrated in FIG. 3, the system 300 may include as DQCD 302 within which a DQCM 306 is embedded, a server 304, a database(s) 312, a plurality of client devices 308(1) . . . 308(n), and a communication network 310.

According to exemplary embodiments, the DQCD 302 including the DQCM 306 may be connected to the server 304, and the database(s) 312 via the communication network 310. The DQCD 302 may also be connected to the plurality of client devices 308(1) . . . 308(n) via the communication network 310, but the disclosure is not limited thereto.

According to exemplary embodiment, the DQCD 302 is described and shown in FIG. 3 as including the DQCM 306, although it may include other rules, policies, modules, databases, or applications, for example. According to exemplary embodiments, the database(s) 312 may also be a private cloud-based datacenter that supports user authentication, datacenter security, and integration with existing datacenters and developments as well as stores open API specification definition file (i.e., in JSON format) corresponding to an application, but the disclosure is not limited thereto.

According to exemplary embodiments, the database(s) 312 may be embedded within the DQCD 302. According to exemplary embodiments, the database(s) 312 may be configured to store distribution event data corresponding to margin requirements for an agreement between a client and a service provider, but the disclosure is not limited thereto.

Figure 6:
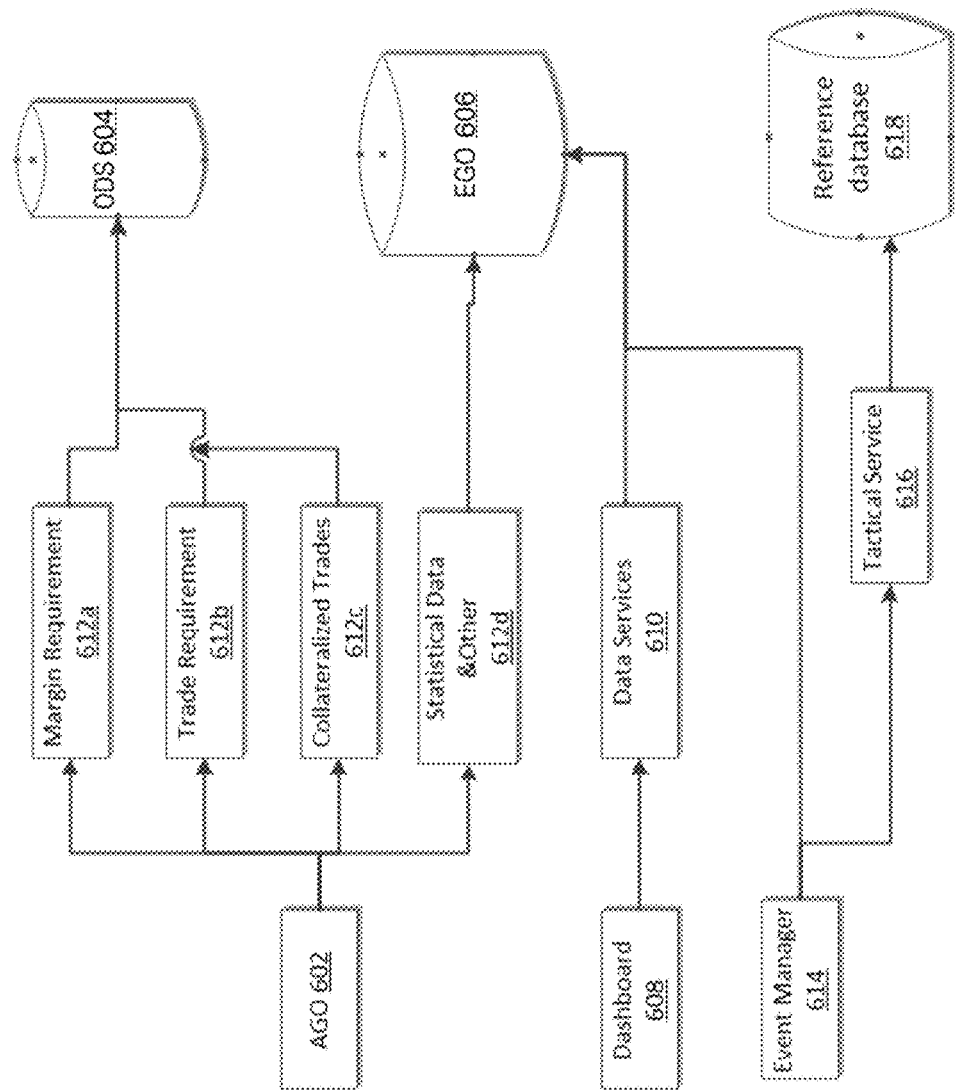
FIG. 6 illustrates a data flow diagram of various databases implemented in FIG. 4 in accordance with an exemplary embodiment.

According to exemplary embodiments, the DQCM 306 may be configured to receive real-time feed of data from the plurality of client devices 308(1) . . . 308(n) via the communication network 310. Although one database(s) 312 is illustrated in FIG. 3, the disclosure is not limited thereto. The database(s) 312 may include a plurality of data sources as illustrated in FIG. 6.

As will be described below, the DQCM 306 may be configured to receive distribution event data from the database(s) 312 as input corresponding to margin requirements for an agreement between a client and a service provider; access one or more data sources (see, e.g., FIG. 6) for collecting all facts data corresponding to the agreement based on corresponding received distribution event data in accordance with margin node context identification associated with the agreement; calculate statistical analysis data based on historical data points of the facts data for the agreement with all combination of exposure types and methods; create and configure dynamic rules that are required to be applied for determining whether the agreement is in good order; verify the statistical analysis data against the miles to determine anomaly data; mark the agreement as a good order agreement flag when it is determined that the anomaly data is within a predetermined threshold value; and automatically execute, in response to marking the agreement as a good order agreement flag, a straight through processing of the agreement without manual intervention.

The plurality of client devices 308(1) . . . 308(n) are illustrated as being in communication with the DQCD 302. In this regard, the plurality of client devices 308(1) . . . 308(n) may be "clients" of the DQCD 302 and are described herein as such. Nevertheless, it is to be known and understood that the plurality of client devices 308(1) ... 308(n) need not necessarily be "clients" of the DQCD 302, or any entity described in association therewith herein. An additional or alternative relationship may exist between either or both of the plurality of client devices 308(1) ... 308(n) and the DQCD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) ... 308(n) may communicate with the DQCD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The DQCD 302 may be the same or similar to the DQCD 202 as described with respect to FIG. 2, including any features or combination of features described with respect thereto.

Figure 4:
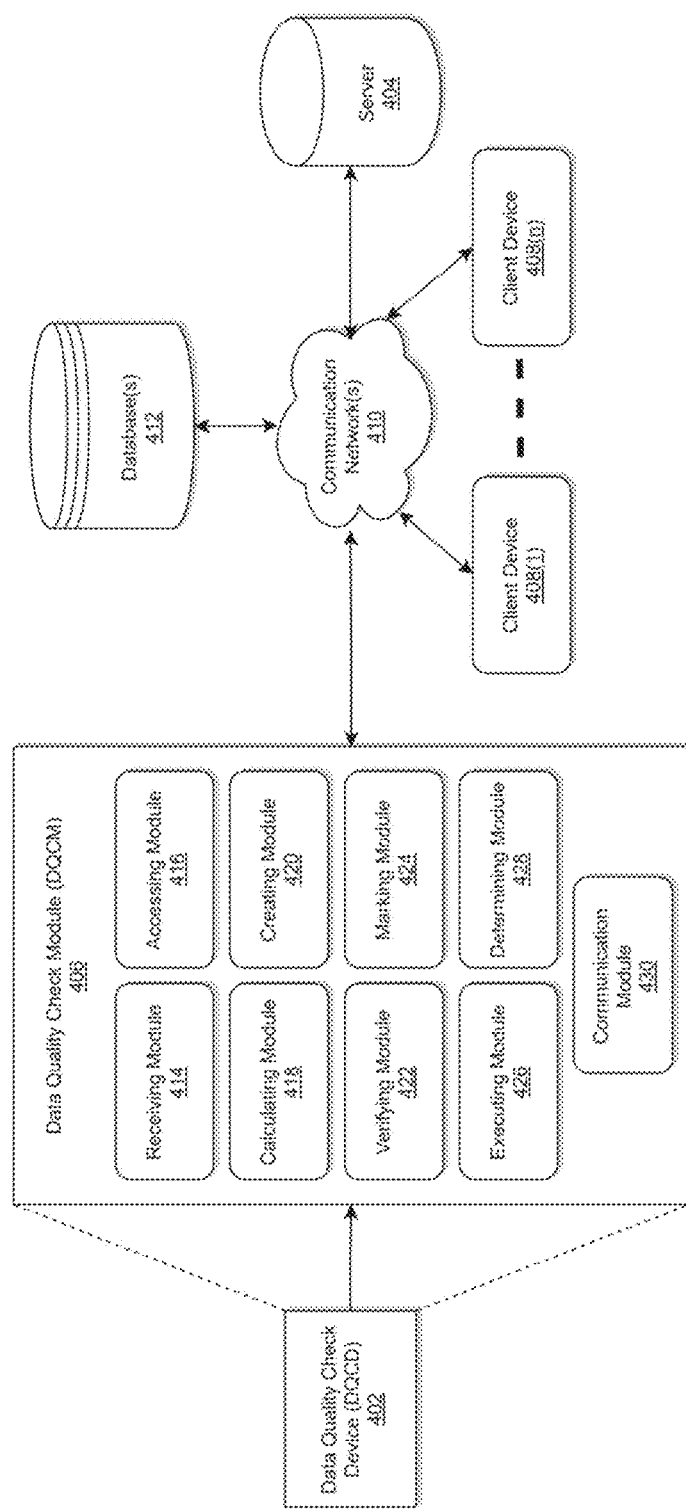
FIG. 4 illustrates a system diagram for implementing a data quality check module of FIG. 3 in accordance with an exemplary embodiment.

FIG. 4 illustrates a system diagram for implementing a DQCM of FIG. 3 in accordance with an exemplary embodiment.

According to exemplary embodiments, the system 400 may include a DQCD 402 within which a DQCM 406 is embedded, a server 404, a database(s) 412, and a communication network 440.

According to exemplary embodiments, the DQCD 402 including the DQCM 406 may be connected to the server 404, and the database(s) 412 via the communication network 410, The DQCD 402 may also be connected to the plurality of client devices 408(1) ... 408(n) via the communication network 410, but the disclosure is not limited thereto. According to exemplary embodiments, the DQCD 402, the DQCM 406, the database(s) 412, the server 404, the client devices 408(1)-408(n), and the communication network 410 as illustrated in FIG. 4 may be the same or similar to the DQCD 302, the DQCM 306, the database(s) 312, the server 304, the client devices 308(1)-308n), and the communication network 310, respectively, as illustrated in FIG. 3.

According to exemplary embodiments, as illustrated in FIG. 4, the DQCM 406 may include a receiving module 414, an accessing module 416, a calculating module 418, a creating module 420, a verifying module 422, a marking module 424, an executing module 426, a determining module 428, and a communication module 430.

The process may be executed via the communication module 430 and the communication network 410, which may comprise plural networks as described above. For example, in an exemplary embodiment, the various components of the DQCM 406 may communicate with the server 404, and the database(s) 412 via the communication module 432 and the communication network 410. Of course, these embodiments are merely exemplary and are not limiting or exhaustive.

According to exemplary embodiments, the communication network 410 and the communication module 432 may be configured to establish a link between the database(s) 412, the client devices 408(1)-408(n) and the DQCM 406.

According, to exemplary embodiments, each of the receiving module 414, accessing module 416, calculating module 418, creating module 420, verifying module 422, marking module 424, executing module 426, determining module 428, and the communication module 430 may be implemented by microprocessors or similar, they may be programmed using software (e.g., microcode) to perform various functions discussed herein and may optionally be driven by firmware and/or software. Alternatively, each of the receiving module 414, accessing module 416, calculating module 418, creating module 420, verifying module 422, marking module 424, executing module 426, determining module 428, and the communication module 430 may be implemented by dedicated hardware, or as a combination of dedicated hardware to perform some functions and a processor (e.g., one or more programmed microprocessors and associated circuitry) to perform other functions. Also, according to exemplary embodiments, each of the receiving module 414, accessing module 416, calculating module 418, creating module 420, verifying module 422, marking module 424, executing module 426, determining module 428, and the communication module 430 may be physically separated into two or more interacting and discrete blocks, units, devices, and/or module without departing from the scope of the inventive concepts.

According to exemplary embodiments, each of the receiving module 414, accessing module 416, calculating module 418, creating module 420, verifying module 422, marking module 424, executing module 426, determining module 428, and the communication module 430 of the DQCM 406 may be called by corresponding API, but the disclosure is not limited thereto.

Figure 5:
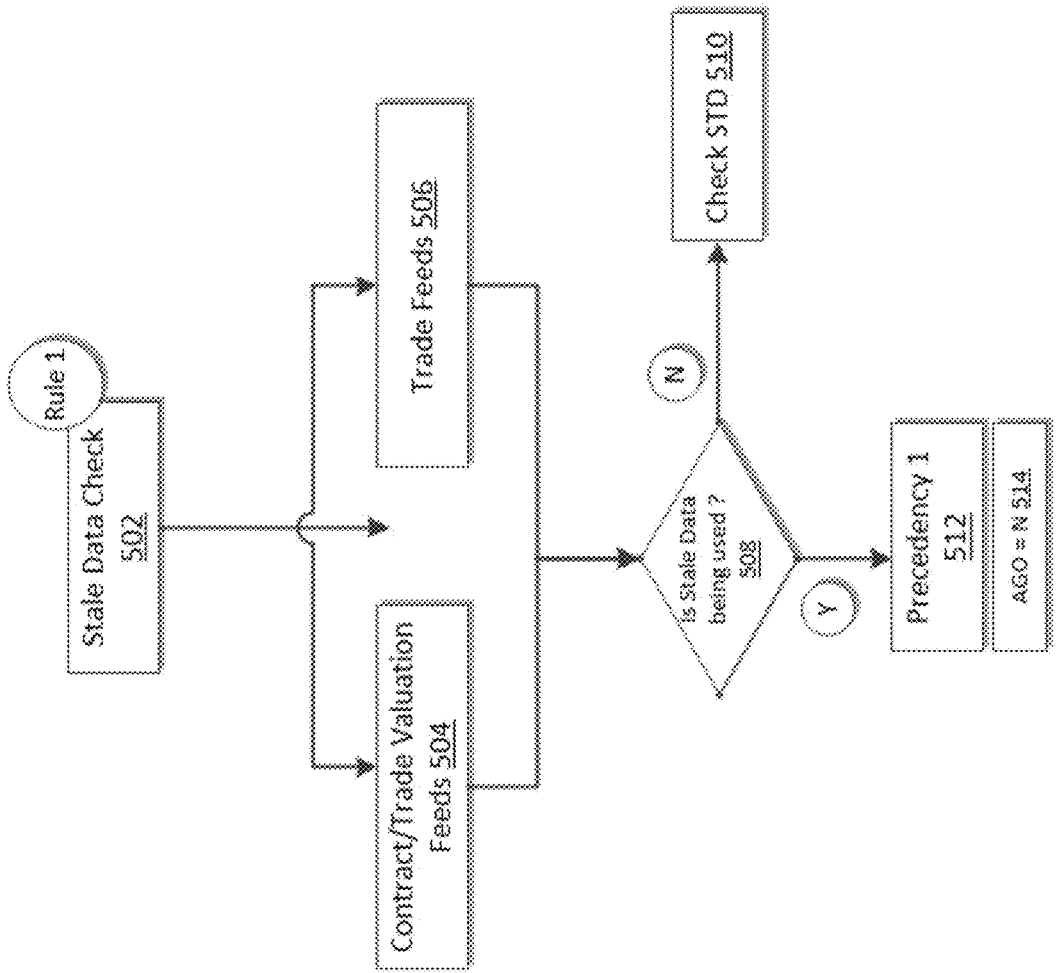
FIG. 5 illustrates a flow chart for checking whether data is stale as implemented by the data quality check module of FIG. 4 in accordance with an exemplary embodiment.
Figure 7:
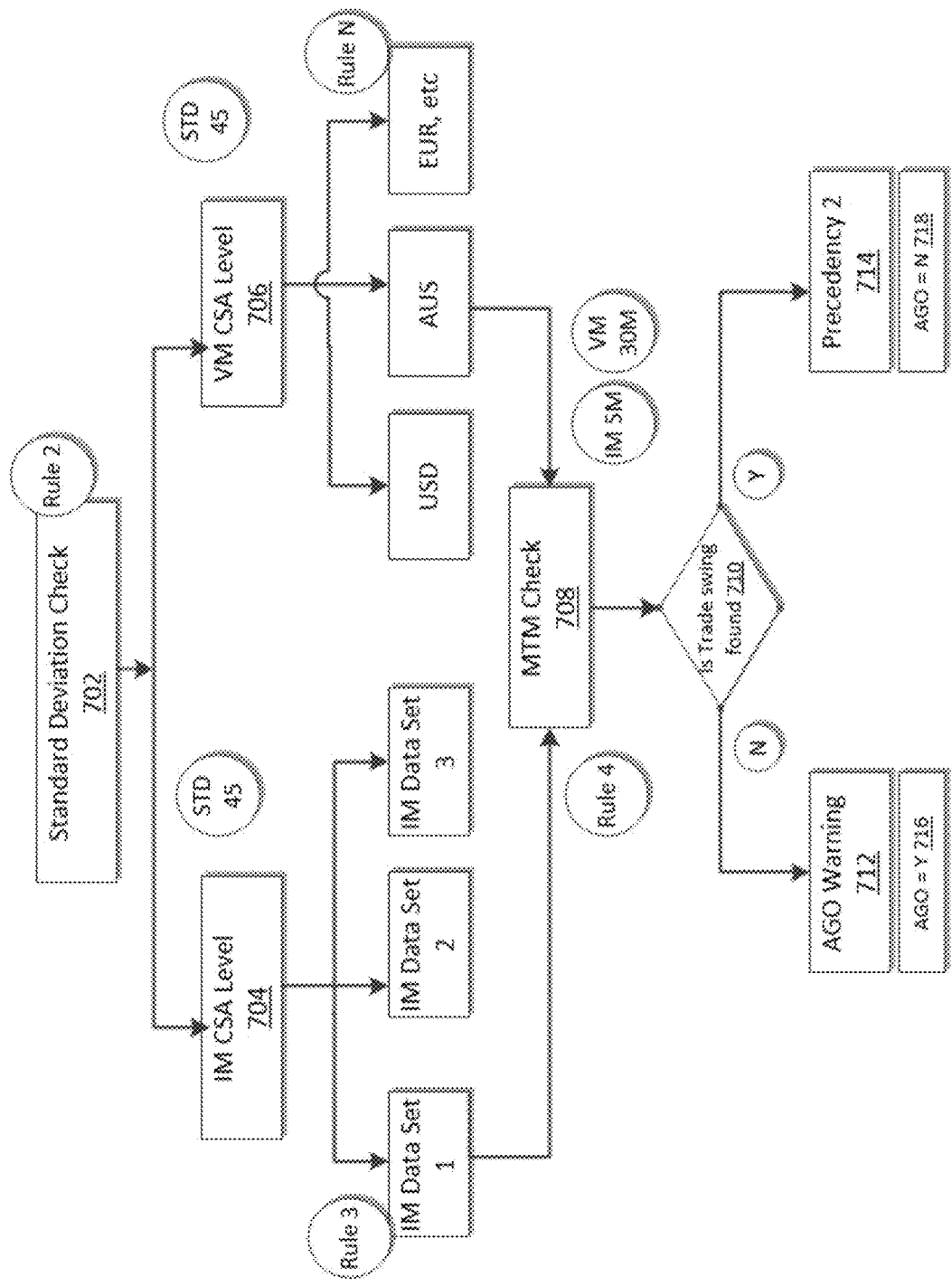
FIG. 7 illustrates a flow chart of a standard deviation check process implemented by the data quality check module of FIG. 4 in accordance with an exemplary embodiment.

FIG. 5 illustrates a flow chart of a process 500 for checking whether data is stale as implemented by the DQCM 406 of FIG. 4 in accordance with an exemplary embodiment. For example, as illustrated in FIG. 5, initially, rule 1 may be implemented by the DQCM 406 to determine whether data is stale or not at step 502 of the process 500. At step 504 of the process 500, contract/trade valuation feeds (i.e., contract/trade valuation data) corresponding to an agreement between a client and a service provider may be received by the receiving module 414. At step 506 of the process 500, trade feeds (i.e., trade data) corresponding to an agreement between a client and a service provider may be received by the receiving module 414. At step 508 of the process 500, the determining nodule 428 may be configured to determine whether stale data (i.e., not current data) is being used. If it is determined at step 508 that stale data is not being used, at step 510 of the process 500 proceed to check standard deviation (STD) process as illustrated in FIG. 7. If it is determined at step 508 that stale data is being used, at step 512 of the process 500, the marking module 424 applies precedency 1 rule which indicates a flag (AGO=N) 514 on the agreement to reject the agreement because the agreement is not in good order for straight through processing.

FIG. 6 illustrates a data flow diagram of various databases implemented in FIG. 4 in accordance with an exemplary embodiment. For example, as illustrated in FIG. 6, the dam flow diagram 600 illustrates that AGO (agreement good order) 602 is operatively connected to a plurality of data sources, e.g., a margin requirement data source 612a, a trade requirement data source 612b, a collateralized trades data source 612c, a statistical data and other data source 612d, etc., to provide corresponding facts data in connection with the agreement. As illustrated in FIG. 6, the margin requirement data source 612a, the trade requirement data source 612b, and the collateralized trades data source 612c may be operatively connected to a one margin data source (ODS) 604. The statistical data and other data source 612d is operatively connection to an every good order (EGO) data source 606.

According to exemplary embodiments, as illustrated in FIG. 6, the dashboard 608 implemented by the DQCM 406 may be operatively connected to various data services 610 in connection with the agreement and those data services 610 may be operatively connected to the EGO data source 606. Further, according to exemplary embodiments, as illustrated in FIG. 6, the event manager 614 implemented by the DQCM 406 may be operatively connected to a tactical service 616 in connection with the agreement and the tactical service 616 may be operatively connected to a reference database 618.

Referring back to FIGS. 4-6, according to exemplary embodiments, FIG. 7 illustrates a flow chart of a standard deviation check process implemented by the data quality check module of FIG. 4 in accordance with an exemplary embodiment.

According to exemplary embodiments, the receiving module 414 may be configured to receive distribution event data as input corresponding to margin requirements for an agreement between a client and a service provider. The accessing module 416 may be configured to access one or more data sources (i.e., the margin requirement data source 612a, the trade requirement data source 612b, the collateralized trades data source 612c, the statistical data and other data source 612d, etc.) for collecting all facts data corresponding to the agreement based on corresponding received distribution event data in accordance with margin node context identification associated with the agreement;

According to exemplary embodiments, the calculating module 418 may be configured to calculate statistical analysis data based on historical data points of the facts data for the agreement with all combination of exposure types and methods. The creating module 420 may be configured to create and configure dynamic rules (e.g., rule 1 . . . rule N as illustrated in FIGS. 5 and 7) that are required to be applied for determining whether the agreement is in good order.

According to exemplary embodiments, the verifying module 422 may be configured to verify the statistical analysis data against the rules to determine anomaly data. In calculating statistical analysis data, the calculating module 418 may be configured to calculate moving average data based on historical data points of the facts data for the agreement from a predefined time point (i.e., within the last forty five days, but the disclosure is not limited thereto); and calculate standard deviation data in response to calculating the moving average data as illustrated in FIG. 7.

For example, FIG. 7 illustrates a flow chart 700 of a standard deviation check process 702 implemented by the DQCM 406 of FIG. 4 in accordance with an exemplary embodiment. As illustrated in FIG. 7, rule 2 may be implemented by the DQCM 406 to check standard deviation between initial margin (IM) customer service agreement (CSA) data received from the IM CSA level 704 and the variation margin (VM) CSA data from the VM CSA level 706. The DQCM 406 may implement rule 3 in which data flows from the IM CSA level 704 to generate a plurality of IM data sets 1, 2, 3, but the disclosure is not limited thereto. According to exemplary embodiments, IM data sets may include data sets corresponding to security deposits, but the disclosure is not limited thereto. The DQCM 406 may implement rule N in which data flows from the VM CSA level 706 to generate currency data corresponding to a country USD, AUS, EUR, etc.), but the disclosure is not limited thereto.

At step 708 of the flow chart 700, the DQCM 406 implement rule 4 where mark to market (MTM) check is executed. At step 710, it is determined whether any trade swing (i.e., a discrepancies or anomalies between today's trade and historical trade data within a predefined period (e.g., forty five days)) between IM and VM. If it is determined at step 710 that there is no trade swing, then an AGO warning is issued at step 712 with a flag 716 (AGO=Y) to indicate that the agreement is in good order to be proceed to straight through processing without manual intervention. However, if it is determined at step 710 that there is trade swing, then the DQCM 406 implements applies precedency 2 rule at step 714 which indicates a flag 718 (AGO=N) on the agreement to reject the agreement because the agreement is not in good order for straight through processing.

Figure 8:
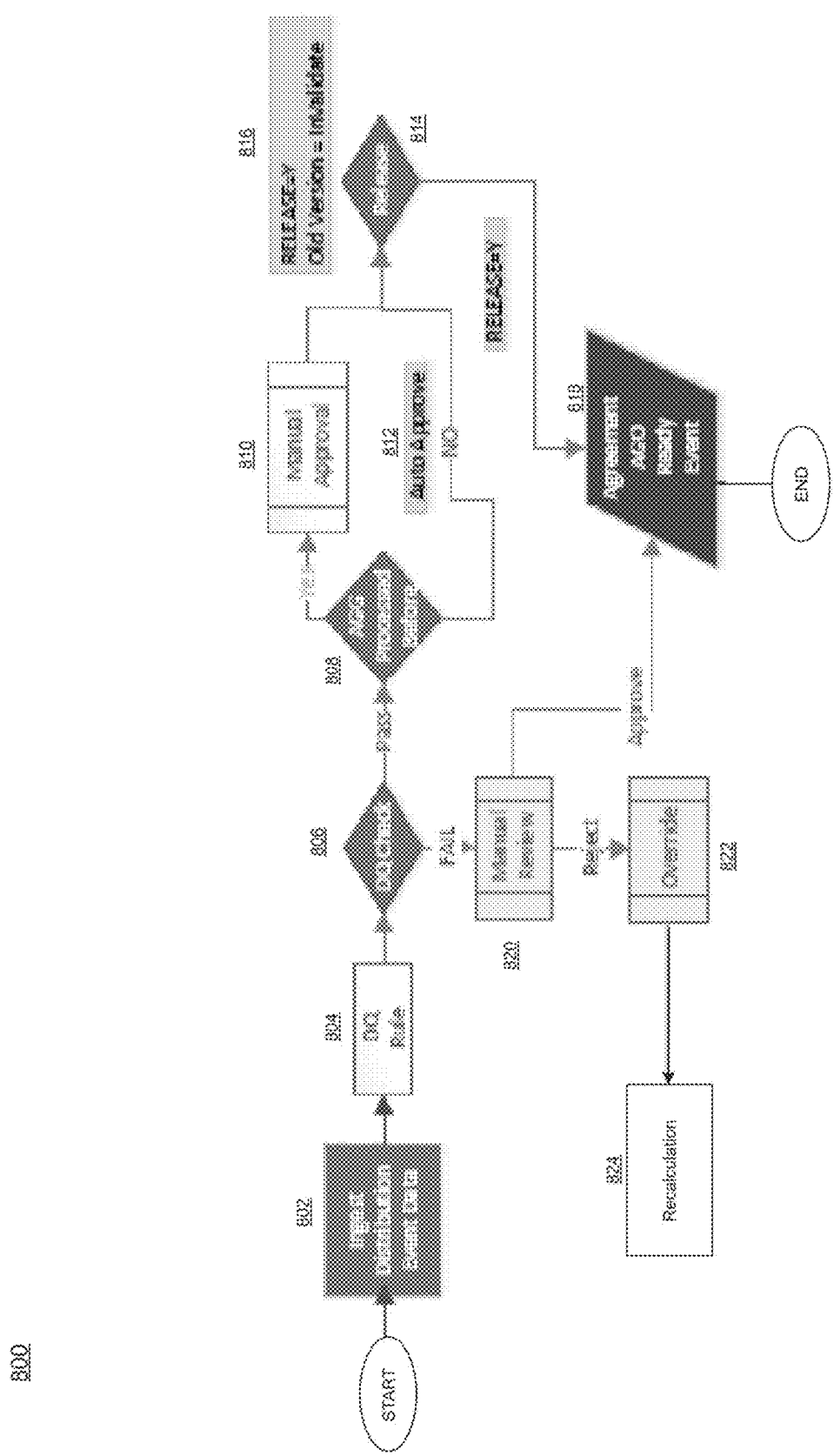
FIG. 8 illustrates a flow chart of agreement good order readiness process implemented by the data quality check module of FIG. 4 in accordance with an exemplary embodiment.

FIG. 8 illustrates a flow chart of agreement good order readiness process 800 implemented by the DQCM 406 of FIG. 4 in accordance with an exemplary embodiment. As illustrated in FIG. 8, at step 802, the DQCM 406 ingests distribution event data. At step 804, data quality rule is applied and at step 806 data quality is checked. If data quality check is passed, then at step 808 it is determined by the determining module 428 whether the agreement (AGG) was processed before or not. If it is determined by the determining module 428 that the agreement was processed before, then at step 810, the agreement is sent for manual approval for releasing the agreement at step 814 (i.e., by manually indicating a flag 816 RELEASE=Y; old version=Invalidate). If it is determined by the determining module 428 that the agreement was not processed before, then at step 812, the agreement is automatically approved and at step 814 the agreement is automatically released based on the flag RELEASE=Y and then proceeds to step 818 for agreement AGO ready event.

However, if at step 806, the determining module 428 determines that the data quality check has failed, then at step 820, the data quality is checked by manual review. During manual review, the data quality may be approved and sent to agreement AGO ready event. Alternatively, during manual review, the data quality may be rejected and overridden at step 822 and sent for recalculation at step 824.

Referring back to FIGS. 4-8, according to exemplary embodiments, the marking module 424 may be configured to mark the agreement as a good order agreement flag 716 when it is determined by the determining module 428 that the anomaly data is within a predetermined threshold value; and the executing module 426 may be configured to automatically execute, in response to marking the agreement as a good order agreement flag (AGO=Y), a straight through processing of the agreement without manual intervention.

According to exemplary embodiments, wherein the anomaly data may indicate what data points our outliers and what data points are within the predetermined range for acceptable data points, but the disclosure is not limited thereto.

According to exemplary embodiments, as disclosed above, the marking module 424 may be configured to mark the agreement as not a good order agreement flag 718 (AGO=N) when it is determined by the determining module 428 that the anomaly data is not within the predetermined threshold value: and the executing module 426 may be configured to block execution of the straight through processing of the agreement and send for manual approval or correction as illustrated in FIG. 8.

According to exemplary embodiments, the determining module 428 may be configured to determine what data points associated with the agreement are not within the predetermined threshold value. The receiving module 424 may be configured to receive input data indicating that the data points associated with the agreement that are not within the predetermined threshold have been manually verified (see, e.g., FIG. 8) and the executing module 426 may be configured to automatically execute, in response to receiving the input data, a straight through processing of the agreement.

According to exemplary embodiments, the determining module 428 may be configured to determine what data points associated with the agreement are not within the predetermined threshold value. The receiving module 424 may be configured to receive input data indicating that the data points associated with the agreement that are not within the predetermined threshold have been manually corrected (see, e.g., FIG. 8) and the executing module 426 may be configured to automatically execute, in response to receiving the input data, a straight through processing of the agreement.

Figure 9:
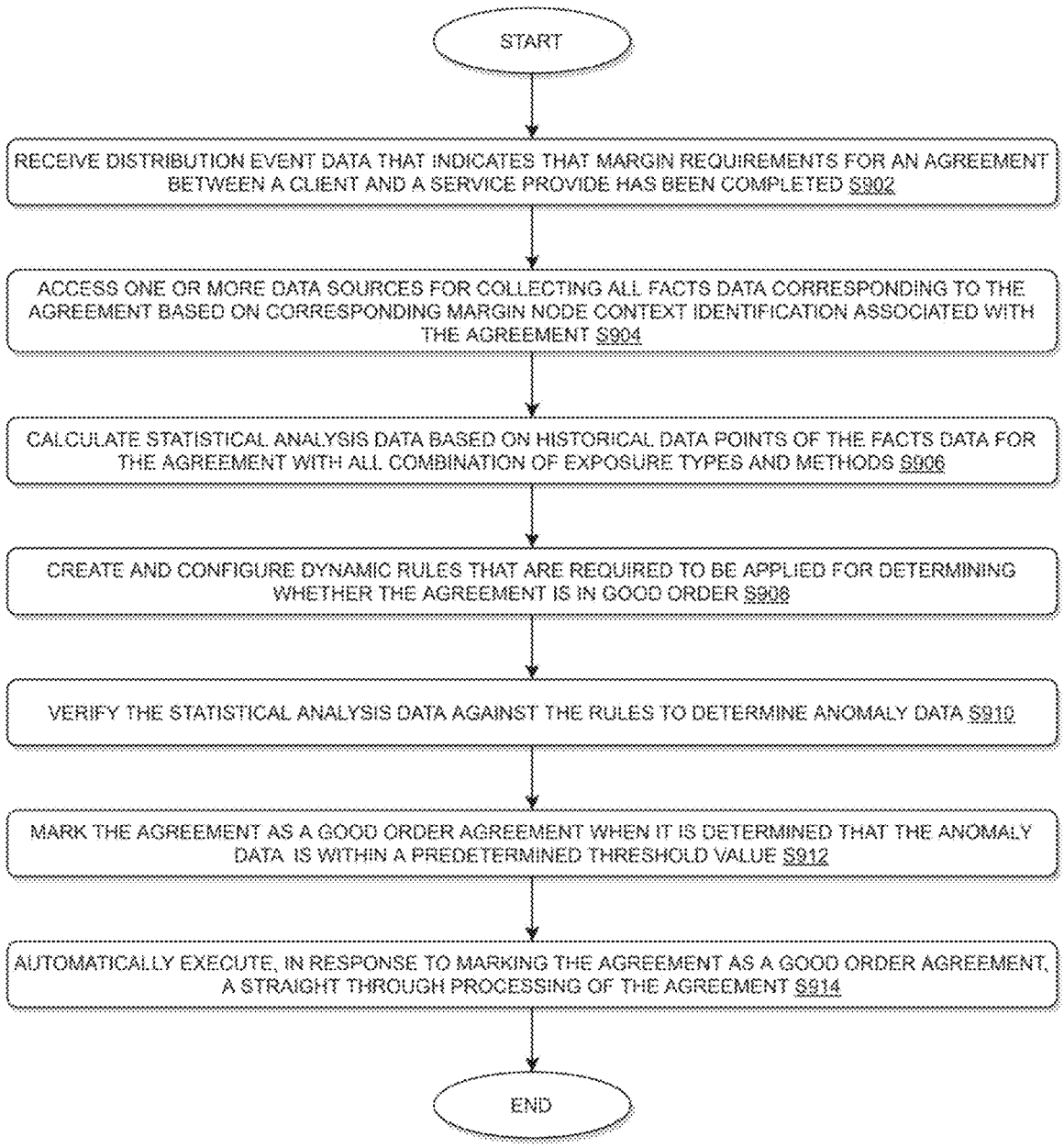
FIG. 9 illustrates another flow chart of agreement good order readiness process implemented by the data quality check module of FIG. 4 in accordance with an exemplary embodiment.

FIG. 9 illustrates another flow chart of agreement good order readiness process 600 implemented by the DQCM 406 of FIG. 4 in accordance with an exemplary embodiment.

As illustrated in FIG. 9, at step 902, the process 900 may include receiving distribution event data as input corresponding to margin requirements for an agreement between a client and a service provider.

At step 904, the process 900 may include accessing one or more data sources for collecting all facts data corresponding to the agreement based on corresponding received distribution event data in accordance with margin node context identification associated with the agreement.

At step 906, the process 900 may include calculating statistical analysis data based on historical data points of the facts data for the agreement with all combination of exposure types and methods.

At step 908, the process 900 may include creating and configuring dynamic rules that are required to be applied for determining whether the agreement is in good order.

At step 910, the process 900 may include verifying the statistical analysis data against the rules to determine anomaly data.

At step 912, the process 900 may include marking the agreement as a good order agreement flag when it is determined that the anomaly data is within a predetermined threshold value.

At step 914, the process 900 may include automatically executing, in response to marking the agreement as a good order agreement flag, a straight through processing of the agreement without manual intervention.

According to exemplary embodiments, the process 900 may further include: marking the agreement as not a good order agreement flag when it is determined that the anomaly data is not within the predetermined threshold value; and blocking execution of the straight through processing of the agreement.

According to exemplary embodiments, the process 900 may further include: determining what data points associated with the agreement are not within the predetermined threshold value; receiving input data indicating that the data points associated with the agreement that are not within the predetermined threshold have been manually verified; and automatically executing, in response to receiving the input data, a straight through processing of the agreement.

According to exemplary embodiments, the process 900 may further include: determining what data points associated with the agreement are not within the predetermined threshold value; receiving input data indicating that the data points associated with the agreement that are not within the predetermined threshold have been manually corrected to be within the predetermined threshold value; and automatically executing, in response to receiving the input data, a straight through processing of the agreement.

According to exemplary embodiments, in calculating statistical analysis data, the process 900 may further include: calculating moving average data based on historical data points of the facts data for the agreement from a predefined time point; and calculating standard deviation data in response to calculating the moving average data.

According to exemplary embodiments, the DQCD 402 may include a memory (e.g., a memory 106 as illustrated in FIG. 1) which may be a non-transitory computer readable medium that may be configured to store instructions for implementing a DQCM 406 for implementing a rules based configurable solution for good order that covers stale data checks, agreement data quality checks, etc., and for automatically validating against the configured rules standard deviation to determine if the data is acceptable or not as disclosed herein. The DQCD 402 may also include a medium reader (e.g., a medium reader 112 as illustrated in FIG. 1) which may be configured to read any one or more sets of instructions, e.g., software, from any of the memories described herein. The instructions, when executed by a processor embedded within the DQCM 406 or within the DQCD 402, may be used to perform one or more of the methods and processes as described herein. In a particular embodiment, the instructions may reside completely, or at least partially, within the memory 106, the medium reader 112, and/or the processor 104 (see FIG. 1) during execution by the DQCD 402.

According to exemplary embodiments, the instructions, when executed, may cause the processor 104 to perform the following receiving distribution event data as input corresponding to margin requirements for an agreement between a client and a service provider; accessing one or more data sources for collecting all facts data corresponding to the agreement based on corresponding received distribution event data in accordance with margin node context identification associated with the agreement; calculating statistical analysis data based on historical data points of the facts data for the agreement with all combination of exposure types and methods; creating and configuring dynamic rules that are required to be applied for determining whether the agreement is in good order; verifying the statistical analysis data against the rules to determine anomaly data; marking the agreement as a good order agreement flag when it is determined that the anomaly data is within a predetermined threshold value; and automatically executing, in response to marking the agreement as a good order agreement flag, a straight through processing of the agreement without manual intervention.

According to exemplary embodiments, the instructions, when executed, may further cause the processor 104 to perform the following: marking the agreement as not a good order agreement flag when it is determined that the anomaly data is not within the predetermined threshold value; and blocking execution of the straight through processing of the agreement.

According to exemplary embodiments, the instructions, when executed, may further cause the processor 104 to perform the following: determining what data points associated with the agreement are not within the predetermined threshold value; receiving input data indicating that the data points associated with the agreement that are not within the predetermined threshold have been manually verified; and automatically executing, in response to receiving the input data, a straight through processing of the agreement.

According to exemplary embodiments, the instructions, when executed, may further cause the processor 104 to perform the following: determining what data points associated with the agreement are not within the predetermined threshold value; receiving input data indicating that the data points associated with the agreement that are not within the predetermined threshold have been manually corrected to be within the predetermined threshold value; and automatically executing, in response to receiving the input data, a straight through processing of the agreement.

According to exemplary embodiments, in calculating statistical analysis data, the instructions, when executed, may further cause the processor 104 to perform the following: calculating moving average data based on historical data points of the facts data for the agreement from a predefined time point; and calculating standard deviation data in response to calculating the moving average data.

According to exemplary embodiments as disclosed above in FIGS. 1-9, technical improvements effected by the instant disclosure may include a platform for implementing a data quality check module that provides a platform for implementing a rules based configurable solution for good order that covers stale data checks, agreement data quality checks, etc., and for automatically validating against the configured rules standard deviation to determine if the data is acceptable or not, and for generating results that flag the data as true or false for STP (Straight through processing), but the disclosure is not limited thereto. According to exemplary embodiments as disclosed above in FIGS. 1-9, technical improvements effected by the instant disclosure may further include a platform for implementing a data quality check module that provides a platform for implementing rules based good order checks where rules are editable at run time without requiring code changes each time, thereby enabling STP and reducing manual intervention and providing faster SLA (Service-Level Agreement), compared to conventional processes, between a service provider and a client, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing a data quality check module for determining whether data is acceptable or not by utilizing one or more processors and one or more memories, the method comprising:
   accessing one or more data sources for collecting all facts data corresponding to an agreement between a client and a service provider based on corresponding received distribution event data in accordance with margin node context identification associated with the agreement;
   calculating statistical analysis data based on historical data points of the facts data for the agreement; wherein the calculating statistical analysis data further comprising: calculating standard deviation data in response to calculating moving average data of the historical data points;
   creating and configuring dynamic rules that are required to be applied for determining whether the agreement is in good order;
   verifying the statistical analysis data against the rules to determine anomaly data;
   marking the agreement as a good order agreement flag when it is determined that the anomaly data is within a predetermined threshold value; and
   automatically executing, in response to marking the agreement as a good order agreement flag, a straight through processing f the agreement.

2. The method according to claim 1, wherein the facts data include one or more of the following data: margin requirement data, trade requirement data, collateralized trades data, and statistical data corresponding to the agreement.

3. The method according to claim 1, wherein the anomaly data indicates what data points our outliers and what data points are within the predetermined range for acceptable data points.

4. The method according to claim 1, further comprising:
   marking the agreement as not a good order agreement flag when it is determined that the anomaly data is not within the predetermined threshold value; and
   blocking execution of the straight through processing of the agreement.

5. The method according to claim 4, further comprising:
   determining what data points associated with the agreement are not within the predetermined threshold value;
   receiving input data indicating that the data points associated with the agreement that are not within the predetermined threshold have been manually verified; and
   automatically executing, in response to receiving the input data, a straight through processing of the agreement.

6. The method according to claim 4, further comprising:
   determining what data points associated with the agreement are not within the predetermined threshold value;
   receiving input data indicating that the data points associated with the agreement that are not within the predetermined threshold have been manually corrected to be within the predetermined threshold value; and
   automatically executing, in response to receiving the input data, a straight through processing of the agreement.

7. The method according to claim 1, wherein the moving average data is calculated based on the historical data points of the facts data for the agreement from a predefined time point.

8. A system for implementing a data quality check module for determining whether data is acceptable or not, the system comprising:
   one or more databases that store distribution event data corresponding to margin requirements for an agreement between a client and a service provider; and
   a processor coupled to the one or more databases via a communication network, wherein the processor is configured to:
      access one or more data sources for collecting all facts data corresponding to the agreement based on corresponding received distribution event data in accordance with margin node context identification associated with the agreement;
      calculate statistical analysis data based on historical data points of the facts data for the agreement, wherein the statistical analysis data is calculated by calculating standard deviation data in response to calculating moving average data of the historical data points;
      create and configure dynamic rules that are required to be applied for determining whether the agreement is in good order;
      verify the statistical analysis data against the rules to determine anomaly data;
      mark the agreement as a good order agreement flag when it is determined that the anomaly data is within a predetermined threshold value; and
      automatically execute, in response to marking the agreement as a good order agreement flag, a straight through processing of the agreement.

9. The system according to claim 8, wherein the facts data include one or more of the following data: margin requirement data, trade requirement data, collateralized trades data, and statistical data corresponding to the agreement.

10. The system according to claim 8, wherein the anomaly data indicates what data points our outliers and what data points are within the predetermined range for acceptable data points.

11. The system according to claim 8, wherein the processor is further configured to:

mark the agreement as not a good order agreement flag when it is determined that the anomaly data is not within the predetermined threshold value; and block execution of the straight through processing of the agreement.

12. The system according to claim 11, wherein the processor is further configured to:

determine what data points associated with the agreement are not within the predetermined threshold value;

receive input data indicating that the data points associated with the agreement that are not within the predetermined threshold have been manually verified; and automatically execute, in response to receiving the input data, a straight through processing of the agreement.

13. The system according to claim 11, wherein the processor is further configured to:

determine what data points associated with the agreement are not within the predetermined threshold value;

receive input data indicating that the data points associated with the agreement that are not within the predetermined threshold have been manually corrected to be within the predetermined threshold value; and automatically execute, in response to receiving the input data, a straight through processing of the agreement.

14. The system according to claim 8, wherein the moving average data is calculated based on the historical data points of the facts data for the agreement from a predefined time point.

15. A non-transitory computer readable medium configured to store instructions for implementing a data quality check module for determining whether data is acceptable or not, wherein, when executed, the instructions cause a processor to perform the following:

accessing one or more data sources for collecting all facts data corresponding to an agreement between a client and a service provider based on corresponding received distribution event data in accordance with margin node context identification associated with the agreement;

calculating statistical analysis data based on historical data points of the facts data for the agreement; wherein the calculating statistical analysis data further comprising: calculating standard deviation data in response to calculating moving average data of the historical data points;

creating and configuring dynamic rules that are required to be applied for determining whether the agreement is in good order;

verifying the statistical analysis data against the rules to determine anomaly data;

marking the agreement as a good order agreement flag when it is determined that the anomaly data is within a predetermined threshold value; and automatically executing, in response to marking the agreement as a good order agreement flag, a straight through processing of the agreement.

16. The non-transitory computer readable medium according to claim 15, wherein the facts data include one or more of the following data: margin requirement data, trade requirement data, collateralized trades data, and statistical data corresponding to the agreement.

17. The non-transitory computer readable medium according to claim 15, wherein the anomaly data indicates what data points our outliers and what data points are within the predetermined range for acceptable data points.

18. The non-transitory computer readable medium according to claim 15, wherein, the instructions, when executed, further cause the processor to perform the following:

marking the agreement as not a good order agreement flag when it is determined that the anomaly data not within the predetermined threshold value; and blocking execution of the straight through processing of the agreement.

19. The non-transitory computer readable medium according to claim 15, wherein, the instructions, when executed, further cause the processor to perform the following:

determining what data points associated with the agreement are not within the predetermined threshold value;

receiving input data indicating that the data points associated with the agreement that are not within the predetermined threshold have been manually verified or manually corrected; and automatically executing, in response to receiving the input data, a straight through processing of the agreement.

20. The non-transitory computer readable medium according to claim 15, wherein the moving average data is calculated based on the historical data points of the facts data for the agreement from a predefined time point.

* * * * *